United States Patent [19]
Fessler et al.

[11] 3,914,193
[45] Oct. 21, 1975

[54] INTUMESCENT COATING COMPOSITIONS CONTAINING CRYSTALLINE MELAMINE PYROPHOSPHATE

[75] Inventors: Robert Glenn Fessler, Martinsville; Bruce Charles Tredinnick, Flemington, both of N.J.

[73] Assignee: American Cyanamid Company, Stanford, Conn.

[22] Filed: Nov. 18, 1971

[21] Appl. No.: 200,171

Related U.S. Application Data

[63] Continuation-in-part of Ser. No. 817,168, April 17, 1969, Pat. No. 3,635,970.

[52] U.S. Cl. ............. 260/17 R; 106/15 FP; 106/18; 106/171; 106/177; 106/186; 260/29.6 MP; 260/29.7 P; 260/33.4 R; 260/33.4 PQ; 260/33.8 UA; 260/42.55; 428/392; 428/402; 428/921
[51] Int. Cl.² .................... C08L 23/02; C09D 5/18
[58] Field of Search ...... 260/17 R, 41 AG, 45.8 NT, 260/29.6 MP, 29.7 P, 45.7 P, 33.4 R, 260/33.4 PQ, 42.55, 29.6 ME, 33.8 UA; 117/126 GF; 106/15 FP

[56] References Cited
UNITED STATES PATENTS

| | | | |
|---|---|---|---|
| 2,755,260 | 7/1956 | Stilbert et al. | 260/17.4 ST |
| 2,984,640 | 5/1961 | Kaplan | 260/33.4 R |
| 3,284,216 | 11/1966 | Kaplan | 260/17 R X |
| 3,513,114 | 5/1970 | Hahn et al. | 260/17 R X |
| 3,635,970 | 1/1972 | Fessler et al. | 260/17 R X |

*Primary Examiner*—Lucille M. Phynes
*Attorney, Agent, or Firm*—Samuel Branch Walker

[57] ABSTRACT

A new low viscosity crystalline form of melamine pyrophosphate having its maximum intensity at a peak in its X-ray diffraction pattern of 3.25 A is readily dispersible in paint and coating systems at a uniquely high concentration because of the low viscosity imparted to such system, and that thereby gives a useful fire-resistant coating.

4 Claims, No Drawings

INTUMESCENT COATING COMPOSITIONS CONTAINING CRYSTALLINE MELAMINE PYROPHOSPHATE

CROSS REFERENCES

This is a continuation-in-part of Ser. No. 817,168 filed Apr. 17, 1969, now U.S. Pat. No. 3,635,970 dated Jan. 18, 1972, entitled CRYSTALLINE MELAMINE PYROPHOSPHATE, which discloses a crystalline melamine pyrophosphate in a new highly dispersible form.

A related, commonly assigned application, William Joseph Clark, FIBERGLASS DISPERSAL IN INTUMESCENT COATING SYSTEMS, Ser. No. 144,404, filed May 17, 1971, now abandoned, discloses the present low viscosity melamine pyrophosphate in intumescent coating compositions which additionally contain a predispersed fiberglass.

SUMMARY OF THE INVENTION

This invention relates to an intumescent fire retardant composition or paint containing a novel crystalline form of melamine pyrophosphate.

Melamine pyrophosphate has been prepared by reacting melamine in an aqueous slurry with a mineral acid such as hydrochloric acid, nitric acid or sulfuric acid to form a melamine acid salt, reacting the salt with sodium pyrophosphate and then adding more acid to precipitate the melamine pyrophosphate. In processes of this type, it has been the practice to use less than the amount of acid required for completion of the reaction until after the addition of the sodium pyrophosphate. In one convenient form of this method, melamine and sodium pyrophosphate are first dispersed in water. Sufficient mineral acid is added to provide a melamine to acid molar ratio of 1:1. The slurry is heated and then more acid is added to effect the precipitation of the melamine pyrophosphate. Many of the various known processes for preparing melamine pyrophosphate are disclosed by Vol'frovich et al., Izv. Akad, Nauk SSSR, Otd. Khim. Nauk, No. 6 (1946) pp. 571–579.

Melamine pyrophosphate is used in intumescent fire and heat retardant paints.

One group of weather-resistant fire retardant paints is disclosed in U.S. Pat. No. 2,984,640, Kaplan, WEATHER-RESISTANT FIRE RETARDANT PAINT CONTAINING CHLORINE-CONTAINING ORGANIC POLYMER, AND A SPUMIFIC which patent particularly discloses the use of dicyandiamide or melamine pyrophosphate with pentaerythritol or tripentaerythritol and a material such as vinyl chloride as a coating composition using a hydrocarbon solvent to aid in spreading the composition. For use underground in a mine, hydrocarbon solvents would get into the ventilating air, are normally inflammable, and hence unacceptable.

The use of melamine pyrophosphate and dipentaerythritol with glass fibers in a resinous film forming binder is disclosed in U.S. Pat. No. 3,284,216, Kaplan, FIRE RETARDANT COATING with particular reference to a composition having from 2 to 30 percent glass fibers forming a composition which can be sprayed on steel beams as a heavy thick coating for fireproofing such beams.

U.S. Pat. No. 2,755,260, Stilbert, Cummings and Tally, FIRE RETARDANT COATING COMPOSITION, discloses ammonium phosphates and phosphoric acid together with pentitols such as pentaerythritol and an aqueous polymer latex as the film forming agent. A copolymer of vinyl chloride and vinylidene chloride as the chief solid constituents of the latex is set forth.

Melamine pyrophosphate is advantageous because it not only acts as the spumific agent but also releases large amounts of a gas containing nitrogen.

The heretofore available crystalline form of melamine pyrophosphate has had the disadvantage of thickening an aqueous slurry thereof excessively thereby limiting the quantity of spumific agent permissible in the paint formulation. As a consequence, the aqueous intumescent paints sometimes have not provided sufficient protection for a substrate coated therewith.

This invention uses a new crystalline form of melamine pyrophosphate called for convenience and to distinguish, low viscosity melamine pyrophosphate.

In producing this low viscosity melamine pyrophosphate, sufficient mineral acid is present in the aqueous medium at the time of the addition of the pyrophosphate salt to provide a total of at least four hydrogen ion equivalents per 2 moles melamine and 1 mole pyrophosphate salt. For example, when sulfuric acid is used with tetrasodium pyrophosphate, at least two moles sulfuric acid per mole tetrasodium pyrophosphate are required in the aqueous medium before reaction of the melamine with the tetrasodium pyrophosphate.

Preferably, the temperature of the slurry and of the solution at the time the pyrophosphate salt is added is from about 50° to about 100°C. with the optimum temperature being within the range of from about 75° to about 85°C.

Although a water soluble pyrophosphate such as a sodium or potassium pyrophosphate is more convenient and is preferred, any suitable alkaline earth metal pyrophosphate such as, for example, calcium or magnesium pyrophosphate may also be used. Although water insoluble, these latter salts dissolve in mineral acid solution generating the pyrophosphoric acid required for the reaction.

Further details are set forth in U.S. Pat. No. 3,635,970, supra herewith incorporated by this reference.

This novel crystalline low viscosity form of melamine pyrophosphate can be distinguished by X-ray analysis. The low viscosity form of melamine pyrophosphate has a line or diffraction peak at an interplanar spacing of 10.64 A. There are other peaks at lower relative intensities in the X-ray diffraction pattern of the product of this invention which are different from peaks in the X-ray diffraction patterns of products obtained with other processes. The maximum intensity is at a peak of 3.25 A in the X-ray diffraction pattern of the low viscosity form.

The low viscosity crystalline form of melamine pyrophosphate behaves differently upon thermogravimetric analysis. Thus, when older forms are heated, a weight loss occurs from a temperature of about 285° up to about 315°C. Upon further heating to higher temperatures, weight loss again begins to take place at a temperature of about 350°C. The new low viscosity form of melamine pyrophosphate loses weight substantially continuously with no interruption as the temperature is increased from about 300° up to 350°C. and higher.

The low viscosity crystalline form of melamine pyrophosphate provides a thinner slurry per unit weight. The viscosity of aqueous systems expressed in Krebs Units (KU) determined with a Stormer Viscosimeter by the method described at pages 743 and 744 of "Organic Coating Technology," by H.F. Payne, published by John Wiley and Sons, New York, N.Y. (1961) were as follows:

TABLE I

| Grams MPP+ per 100 grams Water | Viscosity (KU) Prior Art Form | Viscosity (KU) Low Viscosity Form |
|---|---|---|
| 80 | 97 | 60 |
| 90 | 118 | 66 |
| 100 | >146 | 72.5 |
| 120 | —++ | 88 |
| 160 | —++ | 120 |
| 180 | —++ | >146 |

+Melamine pyrophosphate
++Not fluid

The low viscosity melamine pyrophosphate can be used to advantage as a substitute for the old form in flame retardant and intumescent compositions including, for example, those disclosed in U.S. Pat. Nos. 2,599,059; 2,755,260; 2,984,640 and 3,284,216 and the patents referred to therein and is most advantageous in water based compositions such as latex paints. A sufficient amount of the low viscosity form may be incorporated into aqueous type intumescent compositions for intumescence without adversely affecting the working properties of the composition.

Intumescent compositions contain, in general, a volatile vehicle such as water which evaporates as the coating dries, a film former or binder such as a synthetic resin and spumific agents. The low viscosity form is also useful in oil based paints and coating compositions.

The intumescent coating compositions containing the low viscosity melamine pyrophosphate may be applied by spraying, painting or dripping to various surfaces including wood, metal, glass, plastics or fabrics.

In the following examples, all parts are by weight unless otherwise specified.

EXAMPLE I

Preparation of Low Viscosity Melamine Pyrophosphate

To about 910 parts of water are added about 57 parts of melamine with stirring and the slurry temperature is raised to about 80°C.

To the slurry are then added about 88.4 parts 37.2 percent aqueous hydrochloric acid with agitation. Solution of the melamine as melamine hydrochloride occurs almost immediately. Then about 60 parts of powdered anhydrous tetrasodium pyrophosphate are added gradually with agitation while maintaining a temperature of about 80°C. Melamine pyrophosphate starts to precipitate almost immediately upon the initial addition of the sodium pyrophosphate. The temperature is held at about 80°C. while stirring an additional 15 minutes. Stirring is then discontinued and the thin white slurry is allowed to cool to about 67°C.; the solid is isolated by filtration, washed with water and dried at about 90°C. Dense, coarse, free-flowing white crystals of melamine pyrophosphate are obtained.

Because of its ease of dispersion in aqueous systems, and the comparatively low viscosity as compared with the prior art melamine pyrophosphate, the form is called LV melamine pyrophosphate.

EXAMPLE II

Prior Art Type Melamine Pyrophosphate

The following typical prior art process was followed to prepare a crystalline product for physical testing and comparison with the product of this invention:

To a slurry of 15.1 lbs. of melamine in 280 lbs. of water heated to 90°C. are added 12.5 lbs. of 22° Be hydrochloric acid (4.4 lbs. HCl) and the slurry is stirred until a clear solution occurs. A solution of 17.6 lbs. of sodium pyrophosphate in 280 lbs. of water is then added to the melamine hydrochloride solution and the temperature is maintained at 90°C. An additional 13.9 lbs. (4.9 lbs. HCl) of 22° Be hydrochloric acid is added. The reaction mixture is then cooled gradually to 25°C. and the solid is collected by filtration and dried. Each time the prior art product is used for comparison herein, it is the product prepared by this process.

X-ray analysis of the products of the foregoing prior art Example II process and of Example I give the following results:

| Interplanar Spacing or Peak A | Relative Intensity Prior Art Example II | Relative Intensity Example I Low Viscosity MPP |
|---|---|---|
| 3.25 | 49 | 100 |
| 4.71 | 45 | 15 |
| 4.94 | 100 | 35 |
| 5.33 | 23 | 26 |
| 10.64 | — | 12 |
| 10.77 | 67 | 16 |

Mixing equal parts by weight water and the prior art product produced a heavily bodied paste. About 6 parts by weight of this prior art Example II product and about four parts water produced a damp crumbly paste.

In constrast thereto, equal parts by weight water and the product of Example I produced a substantially water-thin slurry as did also a mixture of about six parts by weight product of Example I and four parts water.

Similar results are obtained by replacing the tetrasodium pyrophosphate with an equivalent molar amount of tetrapotassium pyrophosphate either of which can be added as a powder or dissolved in water.

EXAMPLE III

To about 39.2 parts of melamine and about 65 parts of 70 percent nitric acid dissolved in about 1,500 parts of water at about 85°C. are added about 41.2 parts of tetrasodium pyrophosphate. Melamine pyrophosphate is precipitated, collected by filtration, washed with water and dried. X-ray analysis of the product shows it has the same crystalline structure as that of Example I.

EXAMPLE IV

To about 800 parts water are added with stirring about 53.5 parts of 37 percent aqueous hydrochloric acid at about 80°C. About 50.4 parts of melamine, about 45.1 parts of 37.2 percent aqueous hydrochloric acid and about 50.8 parts of calcium pyrophosphate are added in that order while continuing to stir the slurry. After about 15 minutes at about 80°C., the slurry is cooled to about 70°C., filtered, washed with water and dried. The X-ray diffraction pattern of the resulting melamine pyrophosphate has a peak at 10.64 A and has its maximum intensity at a peak of 3.25 A.

EXAMPLE V

A mill base is prepared by mixing the following in a ball mill for about 20 hours:

| | Parts |
|---|---|
| Water | 289.0 |
| Potassium tripolyphosphate | 1.5 |
| Ethoxylated castor oil | 4.0 |
| Low Viscosity Melamine pyrophosphate (from Example I) | 332.0 |
| Dipentaerythritol | 102.0 |
| Phenyl mercuric acetate | 0.5 |
| Defoamer (waxes-fatty esters) | 3.0 |
| Titanium dioxide (Unitane " OR-600) | 60.0 |
| Chlorinated paraffin | 40.0 |

The mill base is then reduced with:

| | Parts |
|---|---|
| Hydroxyethyl cellullose (3% solution) | 45.0 |
| Vinyl acetate copolymer resin (55% solids in emulsion) | 220.0 |
| Defoamer (waxes-fatty esters) | 1.0 |

The resulting latex paint has a viscosity of 67 KU and possesses excellent scrub resistance, freeze-thaw and oven stability.

An attempt to repeat Example V using 332 parts of the product of the prior art process Example II in place of that of Example I was unsuccessful because of the unworkable body of the mill base. About 200 parts of the prior art product is the maximum quantity that can be added to this formulation in order for the mill base to be dispersed.

The paint made from the old type crystals and the paint made from the newer low viscosity melamine pyrophosphate can be evaluated for intumescent fire retardant properties as follows:

Douglas fir boards are coated at a total coverage of 125 sq. ft./gal. with two coats and air dried at room temperature for two days. A two-foot inclined test unit is used for determining the fire retardancy. A burner, using natural gas, is positioned so that the top of the burner is two inches from the test board. The flame is adjusted so that an uncoated red oak panel allows the flame front to reach in five minutes a rating of 100. A zero (0) rating is taken as the edge of the flame on an asbestos panel. The space between 0 and 100 is marked off into eight equal sections. The edge of the flame front is observed during burning and is recorded after five minutes. After the test, the maximum height of the char foam is measured.

| | Example V Paint | Paint from Old Crystalline Form |
|---|---|---|
| Flame Spread | 0–2 | 18–20 |
| Char Foam Height (inches) | 0.95–1.0 | .25–.30 |

This data demonstrates that the maximum loading of the older forms of melamine pyrophosphate which can be tolerated produces an emulsion type paint which is inferior to that provided by this invention.

EXAMPLE VI

The following are dispersed in a ball mill for about 16 hours:

| | Parts |
|---|---|
| Water | 278.3 |
| Potassium tripolyphosphate | 3.0 |
| Ethoxylated castor oil | 4.0 |
| Defoamer (waxes-fatty esters) | 3.0 |
| Phenyl mercuric acetate | 0.5 |
| Low Viscosity Melamine pyrophosphate (Example I) | 332.0 |
| Dipentaerythritol | 102.0 |
| Titanium dioxide | 60.0 |
| Chlorinated paraffin | 40.0 |
| Coalescent (ester-alcohol) | 8.5 |
| Hydroxyethyl cellulose (1.5% solution) | 45.0 |

The mill base is reduced with:

| | |
|---|---|
| Vinyl Acrylic Copolymer Resin (55% solids in emulsion) | 220.0 |
| Defoamer (waxes-fatty esters) | 1.0 |

The resulting latex paint has a viscosity of 62 KU and exhibits excellent fire retardant intumescent properties when evaluated as described above with respect to Example V.

Using the test method as described in Example V involving application of the composition to Douglas fir boards, the following results are obtained:

| | |
|---|---|
| Flame Spread | 8 |
| Char Foam Height (inches) | 0.6 |

EXAMPLE VII

An oil-based paint useful as a fire retardant coating is prepared by dispersing the following ingredients in a pebble mill:

| | Parts |
|---|---|
| Vinyl toluene-butadiene resin | 51.1 |
| Chlorinated paraffin | 91.5 |
| Titanium dioxide | 67.0 |
| Low Viscosity Melamine pyrophosphate (Example I) | 389.0 |
| Dipentaerythritol | 119.5 |
| Petroleum hydrocarbon fraction, boiling range about 320° to 350°F. | 311.7 |

EXAMPLE VIII

A mastic composition useful as a fire retardant coating for steel is prepared by mixing the following ingredients:

| | Parts |
|---|---|
| Water | 240 |
| Potassium tripolyphosphate | 2 |
| Ethoxylated castor oil | 5 |
| Low viscosity Melamine pyrophosphate (Example I) | 325 |
| Dipentaerythritol | 90 |
| Defoamer (waxes-fatty esters) | 3 |
| Titanium dioxide | 20 |
| Chlorinated paraffin | 45 |
| Hydroxyethyl cellulose (3% solution) | 45 |
| Vinyl acetate copolymer resin (55% solids emulsion) | 260 |
| Asbestos | 60 |

The defoamer used in the preceding Examples is Colloid 677 sold by Colloid, Inc.

The description of the invention has to a large extent been with reference to intumescent coatings in which the melamine pyrophosphate along with a polyol or other material which burns with carbon charring cause foaming and the formation of a puffed up carbonaceous mass. However, the novel low viscosity crystalline melamine pyrophosphate can be substituted for the old form of crystals in all fire retardant compositions. From about 25 to about 40 percent by weight of low viscosity melamine pyrophosphate crystals give the best results in intumescent coating compositions.

EXAMPLE IX

Glass fibers about one-eighth inch in length and from 3 to 4 microns in diameter were dispersed at the rate of 5 grams of glass fibers in 750 milliliters of dilute sulfuric acid at pH 2 by blending in a high energy dispersing mixer. The glass fibers were separated by filtering and suction, then dried until nearly all of the aqueous acid had been drawn off the fibers, and the mat was 50 percent solids. Without complete drying, the glass fibers were then dispersed in coating compositions and found to have excellent characteristics as regards flow characteristics, flame spread rate, resistance to channeling, film strength, ability to bridge cracks and hiding power at concentrations of 1, 5, 10 and 20 percent of the glass solids based on the total solids in the following coating compositions.

The materials listed below were dispersed in a ball mill by grinding for 16 hours, after which the grind was let down or reduced with a vinyl acetate copolymer resin containing 55 percent solids in the emulsion and a hydroxy ethyl cellulose solution containing 1 ¾ percent solids and in some cases additional water is indicated.

To the mixture was then added glass fibers at the rates shown below to form an excellent coating composition. Three compositions were prepared as shown in the preferred formula, the low range formula, and a high range formula as set forth below:

| Grind | Preferred Formula | Low Range Formula | High Range Formula |
|---|---|---|---|
| Water | 26.0 | 20.0 | 30.0 |
| Potassium tripolyphosphate | 0.3 | 0.2 | 0.6 |
| Ethoxylated castor oil | 0.3 | 0.2 | 0.4 |
| Phenyl mercuric acetate (30%) | 0.05 | 0.03 | 0.06 |
| Defoamer (waxy-fatty esters 12½%) | 0.35 | 0.2 | 0.5 |
| Dipentaerythritol | 5.0 | 4.0 | 7.0 |
| Chlorinated paraffin | 3.0 | 0.0 | 3.6 |
| Titanium dioxide | 4.0 | 4.0 | 5.0 |
| Low Viscosity Melamine pyrophosphate | 21.0 | 16.5 | 28.0 |
| Let Down | | | |
| Vinyl Acetate Copolymer Resin (55%) | 14.0 | 11 | 20 |
| Hydroxy Ethyl Cellulose (1¾%) | 11.0 | 10 | 5 |
| Water | 15.0 | 34 | 0 |
| | 100.0 | 100.0 | 100.0 |
| Predispersed Glass Fiber (as solids) | 0.42 | 0.1 | 2.8 |
| % solids in Formulations | 41.9 | 31.2 | 58.5 |

Additionally when glass fibers ar 1, 5, 10 and 20 percent solids on solids bases were dispersed in these compositions, good results were obtained. The levels above 5 percent tended towards surface roughness.

EXAMPLE X

Flame Tests

The paints were tested for Flame Spread Rate. Predispersed and non-predispersed fiberglass were incorporated as a percent of the solids of the preferred intumescent paint formula with the following results:

| Fiberglass % and Type as solids on solids | Coating Rate ft²/gal. | Flame Spread Rate |
|---|---|---|
| Preferred paint formula, no fiberglass | 125 | 14.3 |
| 2% non-predispersed fiberglass | 125 | 18. |
| 2% predispersed fiberglass | 125 | 10.7 |
| 1% non-predispersed fiberglass | 125 | 14.3 |
| 1% predispersed fiberglass | 125 | 7.0 |
| 1% predispersed fiberglass | 200 | 18.0 |

The test results show that predispersed fiberglass gives lower flame spread rate than non-predispersed fiberglass at 1 and 2 percent of solids on paint solids.

The 2 foot tunnel used is described in "The use of a Small Flame tunnel for Evaluation of Fire Hazard" by H. L. Vandersoll, Monsanto Co., Journal Paint Technology, Volume 39, No. 511, August 1967, Pg, 494–500.

$$\text{Flame Spread Rate} = \frac{100}{Lo - La}(Ls - La)$$

$Lo$ = Average three highest consecutive flame lengths of red oak burning.
$La$ = Average three highest consecutive flame lengths of asbestos board.
$Ls$ = Average three highest consecutive flame lengths of No. 2 fir flooring, with test coating thereon.

EXAMPLES XI, XII, XIII

The following components are ground together in a pebble mill.

Three compositions illustrate different loading of the melamine pyrophosphate in the formulation

| Ground in Pebble Mill: | Pounds XI | XII | XIII |
|---|---|---|---|
| Water | 322.0 | 289.0 | 289.0 |
| Potassium Tripolyphosphate | 1.5 | 1.5 | 1.5 |
| Surfactant (Surfactrol R 365) | 4.0 | 4.0 | 4.0 |
| Low Viscosity Melamine Pyrophosphate | 305.0 | 350.0 | 400.0 |
| Dipentaerylthritol | 75.0 | 87.5 | 100.0 |
| Fungicide (Cosan PMA-30) | 0.5 | 0.5 | 0.5 |
| Colloidizing Agent (Colloid 677) | 3.0 | 3.0 | 3.0 |
| Titanium Dioxide (Unitane R OR-600) | 60.0 | 60.0 | 60.0 |
| Chlorinated Paraffin (Chlorowax R 70) | 40.0 | 40.0 | 40.0 |
| Reduce with: | | | |
| Viscosity Thickening Agent (Natrosol R HR-250 (3% | 45.0 | 45.0 | 7.8 |